United States Patent
Zhang et al.

(10) Patent No.: US 10,462,125 B2
(45) Date of Patent: Oct. 29, 2019

(54) METHOD OF PUSHING PASSWORDS, PUSHING SYSTEM AND TERMINAL DEVICE

(71) Applicant: GUANGDONG OPPO MOBILE TELECOMMUNICATIONS CORP., LTD., Dongguan (CN)

(72) Inventors: Haiping Zhang, Dongguan (CN); Yibao Zhou, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 128 days.

(21) Appl. No.: 15/541,487

(22) PCT Filed: Aug. 1, 2016

(86) PCT No.: PCT/CN2016/092699
§ 371 (c)(1),
(2) Date: Jul. 5, 2017

(87) PCT Pub. No.: WO2017/071352
PCT Pub. Date: May 4, 2017

(65) Prior Publication Data
US 2018/0034799 A1  Feb. 1, 2018

(30) Foreign Application Priority Data

Oct. 28, 2015  (CN) .......................... 2015 1 0719655

(51) Int. Cl.
*H04L 29/06* (2006.01)
*H04L 9/32* (2006.01)
(Continued)

(52) U.S. Cl.
CPC ............ *H04L 63/083* (2013.01); *G06F 21/32* (2013.01); *G06F 21/45* (2013.01); *H04L 9/32* (2013.01);
(Continued)

(58) Field of Classification Search
CPC ....... H04L 9/32; H04L 9/3226; H04L 63/083; H04L 67/26; H04L 63/0861; G06F 21/45; G06F 21/32
See application file for complete search history.

(56) References Cited

U.S. PATENT DOCUMENTS 6,618,806 B1 * 9/2003 Brown .................... G06F 21/32
709/225
7,449,989 B2  11/2008 Smith et al.
(Continued)

FOREIGN PATENT DOCUMENTS

CN  102497635 A  6/2012
CN  102833074 A  12/2012
(Continued)

*Primary Examiner* — Tri M Tran
(74) *Attorney, Agent, or Firm* — Hodgson Russ LLP

(57) ABSTRACT

A method of pushing passwords, a pushing system and a terminal device are provided. The method includes establishing a sharing cryptographic library which stores a plurality of application program identification codes, account names and passwords, receiving first biological characteristic information of a user, and simultaneously receiving a push request including second biological characteristic information and a current application program identification code. An account name and a password of the current application program identification code from the sharing cryptographic library is read, and the account name and the password is pushed to a second terminal device when the first biological characteristic information matches with the second biological characteristic information.

17 Claims, 6 Drawing Sheets

(51) Int. Cl.
 *H04L 29/08* (2006.01)
 *G06F 21/32* (2013.01)
 *G06F 21/45* (2013.01)

(52) U.S. Cl.
 CPC ........ *H04L 9/3226* (2013.01); *H04L 63/0861* (2013.01); *H04L 67/26* (2013.01)

(56) References Cited

U.S. PATENT DOCUMENTS

| | | |
|---|---|---|
| 2011/0224509 A1 | 9/2011 | Fish et al. |
| 2014/0052859 A1* | 2/2014 | Kruglick ................ H04L 41/00 709/225 |
| 2014/0137220 A1 | 5/2014 | Niemela |
| 2015/0163219 A1 | 6/2015 | Lo et al. |

FOREIGN PATENT DOCUMENTS

| | | |
|---|---|---|
| CN | 103281327 A | 9/2013 |
| CN | 103402203 A | 11/2013 |
| CN | 103516701 A | 1/2014 |
| CN | 103795716 A | 5/2014 |
| CN | 103902872 A | 7/2014 |
| CN | 104660688 | 5/2015 |
| CN | 105429949 A | 3/2016 |

\* cited by examiner

METHOD OF PUSHING PASSWORDS, PUSHING SYSTEM AND TERMINAL DEVICE

CROSS REFERENCE TO RELATED APPLICATION

This application claims the priority to PCT Application No. PCT/CN2016/092699, filed on Aug. 1, 2016, which claims the priority to Chinese Patent Application No. 201510719655.9, filed on Oct. 28, 2015 and entitled "METHOD OF PUSHING PASSWORD, PUSHING SYSTEM AND TERMINAL DEVICE". The entire disclosures of the above application are incorporated herein by reference.

BACKGROUND

Field

The present disclosure relates to a technical field of internet network security, and more particularly to a method of pushing passwords, a pushing system, and a terminal device.

Background

In the age of the internet, networks bring us great convenience, which make us increasingly rely on various types of network services.

One consequent problem is that a user needs to register different types of account names and passwords for different application programs. For example, many application programs have different account names and passwords requirements. The account names and passwords must only be numbers, must contain uppercase letters and symbols, must be 6 digits or must be greater than 8 digits, so that the account names and passwords cannot be reused between different application programs. In addition, passwords corresponding to high security level application program bank accounts may be periodically updated.

In a conventional password management method, a password file folder or a password list is managed by a master password, and whether to open the password file folder or password list is determined by judging an identification of the master password, so that a user can search and read an account name and a password in the password file folder or password list. However, this password management method is not only time-consuming, but it also cannot share cryptographic libraries.

SUMMARY OF THE DISCLOSURE

Based on the above-mentioned drawbacks, one objective of the present disclosure is to provide a method of pushing passwords, a pushing system and a terminal device to solve the problems of unavailable sharing cryptographic libraries and time-consuming manual searching.

In order to overcome the above-mentioned drawbacks, the present disclosure provides a method of pushing passwords applicable to a first terminal device, including:

establishing a sharing cryptographic library that stores a plurality of application program identification codes, wherein one account name and one password correspond to each application program identification code;

receiving a first biological characteristic information of a user;

determining that a push request is simultaneously received from a second terminal device, wherein the push request includes a second biological characteristic information and a current application program identification code;

determining whether the first biological characteristic information matches with the second biological characteristic information; and when the first biological characteristic information is matched with the second biological characteristic information, reading an account name and a password of the current application program identification code from the sharing cryptographic library, and pushing the account name and the password of the current application program identification code to the second terminal device.

In order to overcome the above-mentioned drawbacks, the present disclosure provides a system of pushing passwords applicable to a first terminal device, including:

a sharing cryptographic library configured to store a plurality of application program identification codes, wherein one account name and one password correspond to each application program identification code;

a receiving unit configured to receive a first biological characteristic information of a user;

a determination unit configured to determine whether a push request is simultaneously received from a second terminal device, wherein the push request includes a second biological characteristic information and a current application program identification code;

a matching unit configured to determine whether the first biological characteristic information matches with the second biological characteristic information; and a pushing unit configured to read an account name and a password of the current application program identification code from the sharing cryptographic library, and to push the account name and the password of the current application program identification code to the second terminal device, when the first biological characteristic information matches with the second biological characteristic information.

In order to overcome the above-mentioned drawbacks, the present disclosure provides a terminal device including a system of pushing passwords, the system including:

a sharing cryptographic library configured to store a plurality of application program identification codes, wherein one account name and one password correspond to each application program identification code;

a receiving unit configured to receive a first biological characteristic information of a user;

a determination unit configured to determine whether a push request is simultaneously received from a second terminal device, wherein the push request includes a second biological characteristic information and a current application program identification code;

a matching unit configured to determine whether the first biological characteristic information matches with the second biological characteristic information; and a pushing unit configured to read an account name and a password of the current application program identification code from the sharing cryptographic library, and to push the account name and the password of the current application program identification code to the second terminal device, when the first biological characteristic information matches with the second biological characteristic information.

In order to overcome the above-mentioned drawbacks, the present disclosure provides a method of pushing passwords performed in a second terminal device, the method including:

identifying an application program identification code for extracting the application program identification code when a login interface of an application program is enabled;

acquiring second biological characteristic information of a user;

transmitting a push request to a first terminal device, wherein the push request includes the second biological characteristic information of the user and a current application program identification code;

receiving a push response from the first terminal device, wherein the push response includes an account name and a password corresponding to the current application program identification code; and inputting the account name and the password of the push response to the login interface of the application program.

In order to overcome the above-mentioned drawbacks, the present disclosure provides a system of pushing passwords applicable to a second terminal device, the system including:

an identification unit configured to identify an application program identification code for extracting the application program identification code when a login interface of an application program is enabled;

an acquisition unit is configured to acquire second biological characteristic information of a user;

a request unit configured to transmit a push request to a first terminal device, wherein the push request includes the second biological characteristic information of the user and a current application program identification code;

a response unit configured to receive a push response from the first terminal device, wherein the push response includes an account name and a password corresponding to the current application program identification code; and a login unit configured to input the account name and the password of the push response to the login interface of the application program.

Compared with a related art, the present disclosure provides a method of pushing passwords, a pushing system and a terminal device by storing biological characteristic information, application program identification codes, and account names and passwords which are matched with an application program into a terminal device for rapidly and safely sharing the passwords between the terminal devices.

DETAILED DESCRIPTION OF THE PREFERRED EMBODIMENTS

The following embodiments refer to the accompanying drawings for exemplifying specific implementable embodiments of the present disclosure in a suitable computing environment, where similar numerals denote the same elements. It should be noted that the exemplary described embodiments are configured to describe and understand the present disclosure, but the present disclosure is not limited thereto.

The principles of the present disclosure may be described in the text, but it is not limited thereto. Persons skilled in the art should be noted that the various blocks and operations can be implemented in hardware.

Figure 1:
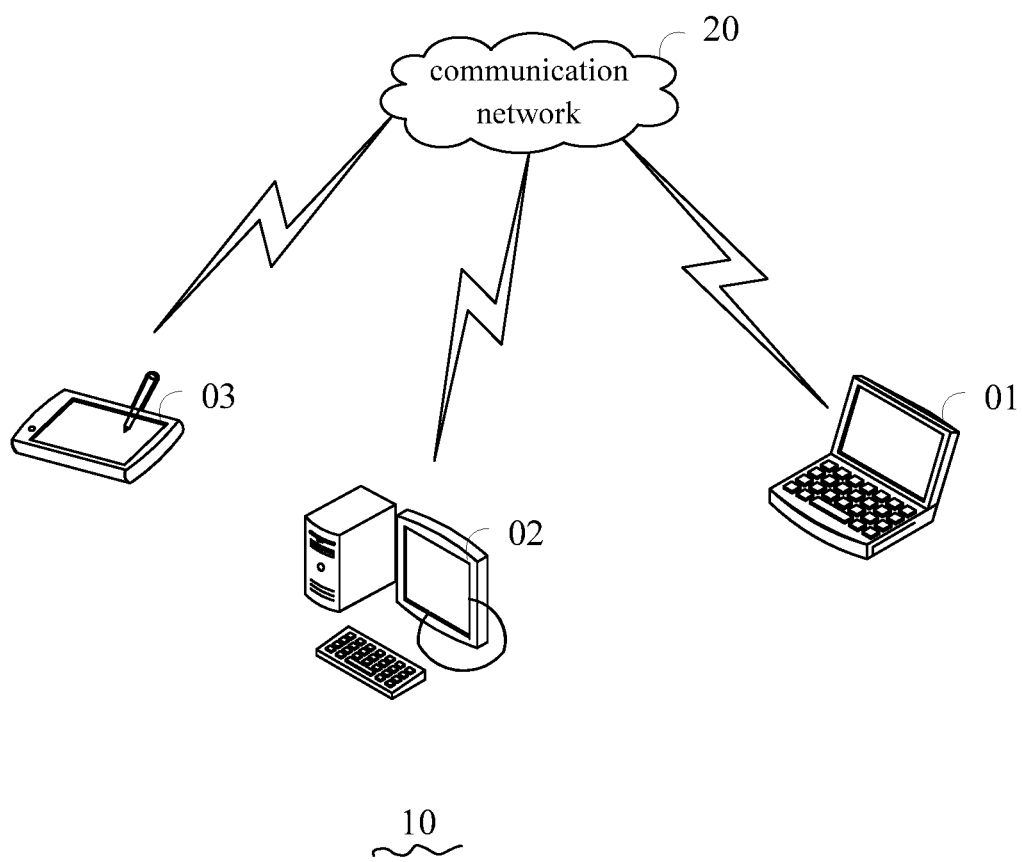
FIG. 1 is an illustrative application environment diagram of a method of pushing passwords and a pushing system according to one embodiment of the present disclosure.

FIG. 1 is an illustrative application environment diagram of a method of pushing passwords and a pushing system according to one embodiment of the present disclosure. The application environment includes a plurality of terminal devices 10 in a communication network 20.

The terminal devices 10 are configured to perform the method of pushing passwords and the pushing system. Specifically, the terminal devices 10 are electronic devices equipped with a biological characteristic acquisition unit and networking capabilities, where the terminal devices 10 are selected from a notebook computer 01, a desktop computer 02, a smart phone 03, a smart watch (not shown), and smart glasses (not shown). In at least one embodiment, the biological characteristic acquisition unit can be embedded in a terminal device 10 or externally connected to the terminal device 10 using a Universal Serial Bus (USB) port.

A first terminal device is configured to store an application program identification code, an account name and a password which are registered by a user, and to encrypt the application program identification code, the account name and the password according to biological characteristic information of the user. A second terminal device is configured to transmit a push request to the first terminal device and to receive a push response from the first terminal device, where the push response includes an account name and a password corresponding to a current application program identification code.

The communication network 20 includes wireless networks and wired networks, where the wireless networks are selected from a wireless wide area network, a wireless local area network, a wireless metropolitan area network, a wireless personal area network, and combinations of the networks.

The present disclosure can be applied to a password pushing program based on iris recognition. Referring to the following embodiments, the first and the second embodiments focus on the method of pushing the passwords, and the third and fourth embodiments focus on the system of pushing the passwords. It will be understood that although emphasis different embodiments, they are consistent in view of a design idea. In at least one embodiment, a portion of descriptions not been described in detail are referred to the detailed description throughout the specification, and are not further described herein.

First Embodiment

Figure 2:
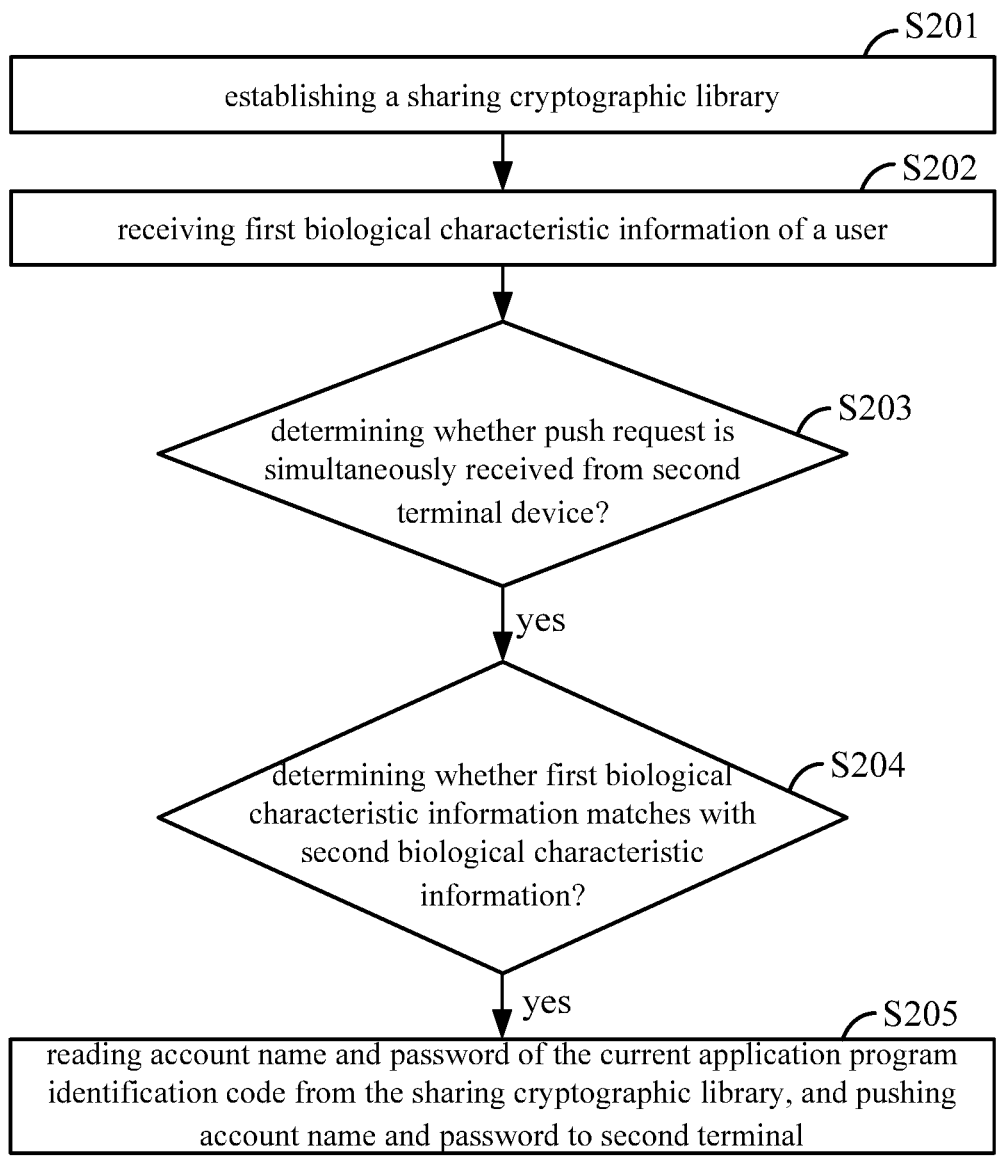
FIG. 2 is an illustrative flowchart of a method of pushing passwords according to a first embodiment of the present disclosure.

FIG. 2 is an illustrative flowchart of a method of pushing passwords according to a first embodiment of the present disclosure. In at least one embodiment, the method of pushing passwords performed in the first terminal transmits the passwords to the second terminal device, where the terminal devices are selected from a smart phone, a computer, a smart watch, and smart glasses, and will not be enumerated herein.

In at least one embodiment, the method of pushing passwords includes the following blocks.

In block S201, a sharing cryptographic library is established.

In at least one embodiment, the sharing cryptographic library is configured to store a plurality of application program identification codes, and one account name and one password corresponding to each application program identification code.

In at least one embodiment, the sharing cryptographic library is encrypted by biological characteristic information of the biological characteristic library to generate an encryption password library. The encryption method includes the following encryption operations.

(1) The sharing cryptographic library is encrypted by a single password (e.g., an iris recognition information).

(2) The sharing cryptographic library is encrypted by multiple parallel passwords. For example, the iris recognition information and fingerprint information are used to execute a parallel encryption so that either one of the iris recognition information and fingerprint information can decrypt the parallel encryption.

(3) The sharing cryptographic library is encrypted by multiple combined passwords. For example, the iris recognition information and fingerprint information are used to execute a combined encryption so that both the iris recognition information and fingerprint information can decrypt the combined decryption.

In block S202, first biological characteristic information of a user is received.

Furthermore, in the block S202, the sharing cryptographic library with the decryption is decrypted by the first biological characteristic information. In at least one embodiment, the decrypted method corresponds to the three ways of the above-mentioned encryption operations.

In block S203, it is determined whether a push request is simultaneously received from a second terminal device while receiving the first biological characteristic information, where the push request includes a second biological characteristic information and a current application program identification code.

In the block S203, that whether the push request is simultaneously received from the second terminal device includes the following operations.

(1) A time interval threshold, such as 60 seconds or three minutes, is set.

(2) Timing will start while the first biological characteristic information of the user is received.

(3) It is determined whether the push request is simultaneously received from the second terminal device within the time interval threshold. When the simultaneous receiving is determined, proceed to block S204. When no simultaneous receiving is determined, there is no response or a no corresponding password prompt will be provided to the user.

In the block S204, it is determined whether the first biological characteristic information is matched with the second biological characteristic information.

In detail, the block S204 further includes the following items.

(1) A biological characteristic library corresponding to the user is established.

A plurality of types of the biological characteristic information in the biological characteristic library are selected from iris recognition information, face recognition information, fingerprint information, palmprint information, and acoustic information.

(2) It is determined whether the first biological characteristic information and the second biological characteristic information originate from the biological characteristic library.

In at least one embodiment, the first biological characteristic information and the second biological characteristic information are the same type or different types of information. In at least one embodiment, when the biological characteristic information belongs to the same user, either iris recognition information acquired by the first terminal device can be matched with iris recognition information acquired by the second terminal device, or the iris recognition information of the user can be matched with the fingerprint information of the user.

(3) When the first biological characteristic information and the second biological characteristic information originate from the biological characteristic library, the first biological characteristic information is matched with the second biological characteristic information to perform block S205.

(4) When the first biological characteristic information and the second biological characteristic information does not originate from the biological characteristic library, the first biological characteristic information is not matched with the second biological characteristic information and there is no response or a prompt of no corresponding password to be provided to the user.

In the block S205, when the first biological characteristic information is matched with the second biological characteristic information, an account name and a password of the current application program identification code are read from the sharing cryptographic library, and the account name and the password of the current application program identification code are pushed to the second terminal device.

In at least one embodiment, the account names and the passwords are pushed to the second terminal device using either plain text or ciphertext.

The present disclosure provides a method of pushing passwords by storing biological characteristic information, application program identification codes, and account names and passwords which are matched with an application program into a terminal device for rapidly and safely sharing the passwords between the terminal devices.

Second Embodiment

Figure 3:
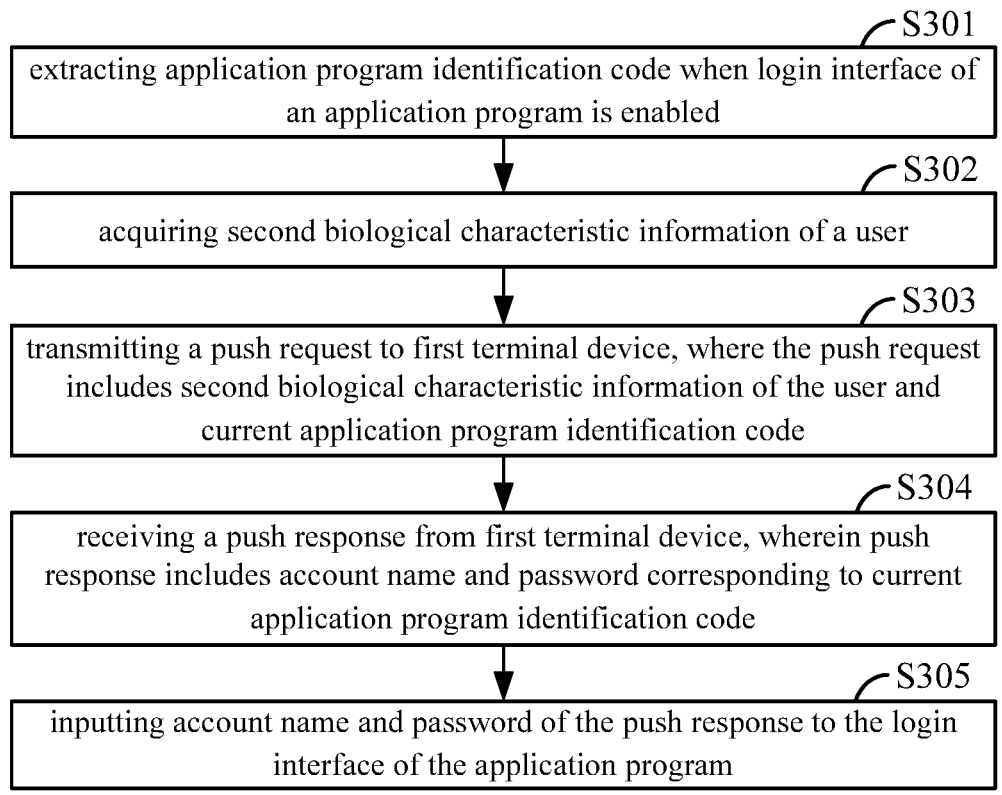
FIG. 3 is an illustrative flowchart of a method of pushing passwords according to a second embodiment of the present disclosure.

FIG. 3 is an illustrative flowchart of a method of pushing passwords according to a second embodiment of the present disclosure. In at least one embodiment, the method of pushing passwords performed in the second terminal transmits the passwords to the first terminal device and receives the pushing passwords from the first terminal device, where the terminal devices are selected from a smart phone, a computer, a smart watch, and smart glasses, and will not be enumerated herein.

In at least one embodiment, the method of pushing passwords includes the following blocks.

In block S301, at least one application program identification code is identified for extracting the application program identification code when a login interface of an application program is enabled. For example, in an application program "WeChat", the application program identification codes include wechat, QQ chat, or a preset identification code "001." In another example of "NETEASE," news in an application program, the expressions of the application program identification codes include netease, Net Ease, or a preset identification code "163".

In block S302, second biological characteristic information of the user is acquired.

The types of the second biological characteristic information in the biological characteristic library include iris recognition information, face recognition information, fingerprint information, palmprint information, acoustic information, and the combinations.

In block S303, a push request is transmitted to the first terminal device, where the push request includes the second biological characteristic information of the user and a current application program identification code.

In at least one embodiment, when the second terminal device transmits the push request to the first terminal device, the second terminal device further sends an identification code of the second terminal device to the first terminal device so that a response pushed by the first terminal device is fed back to the second terminal device.

In block S304, the second terminal device receives a push response from the first terminal device, where the push response includes an account name and a password corresponding to the current application program identification code.

In block S305, the account name and password of the push response are input to the login interface of the application program.

The present disclosure provides a method of pushing passwords by storing biological characteristic information, application program identification codes, and account names and passwords which are matched with an application program into a terminal device for rapidly and safely sharing the passwords between the terminal devices.

Third Embodiment

Figure 4:
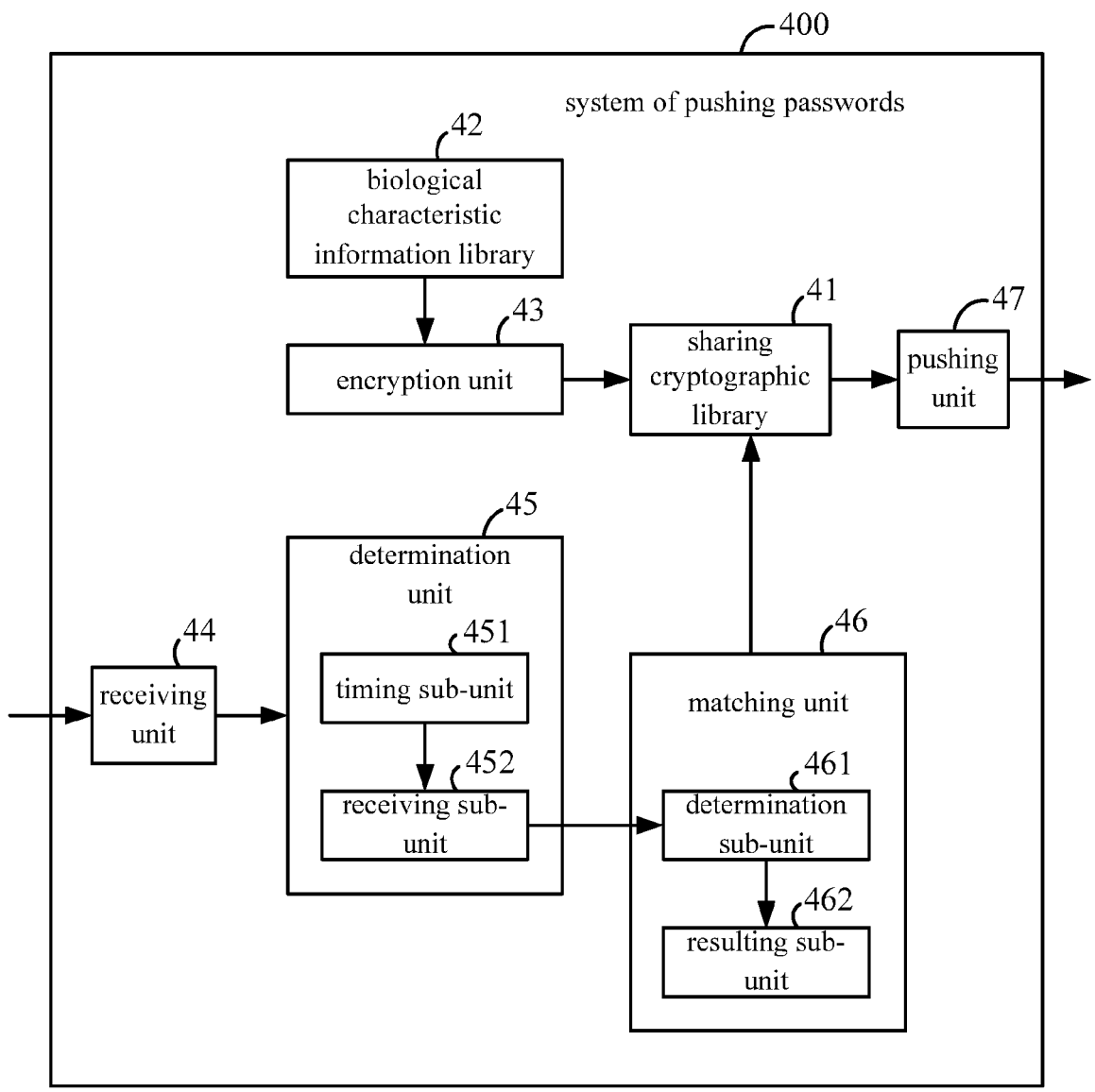
FIG. 4 is an illustrative block diagram of a system of pushing passwords according to a third embodiment of the present disclosure.

FIG. 4 is an illustrative block diagram of a system of pushing passwords according to a third embodiment of the present disclosure. In at least one embodiment, the system of pushing passwords performed in the first terminal transmits the passwords to the second terminal device, where the terminal devices are selected from a smart phone, a computer, a smart watch, and smart glasses, and will not be enumerated herein.

The system 400 of pushing passwords includes a sharing cryptographic library 41, a biological characteristic information, library 42, an encryption unit 43, a receiving unit 44, a determination unit 45, a matching unit 46, and a pushing unit 47.

In at least one embodiment, the sharing cryptographic library 41 is configured to store a plurality of application program identification codes, and an account name and a password corresponding to each application program identification code.

Table 1 illustrates a diagram of the sharing cryptographic library 41, where the sharing cryptographic library 41 corresponds to the user according to one embodiment.

Table 1 shows a sharing cryptographic library 41.

| user | application program identification code | account name | password |
|---|---|---|---|
| 001 | wechat | hill to hill | sws001 |
| | NETEASE news | Hill | Sws001 |
| | internet bank | 7706XXXXXXX3351 | 123456 |

The biological characteristic information library 42 corresponding to the user is configured to store the biological characteristic information of the user.

A plurality of types of the biological characteristic information in the biological characteristic library are selected from iris recognition information, face recognition information, fingerprint information, palmprint information, and acoustic information.

The encryption unit 43 coupled to the sharing cryptographic library 41 and the biological characteristic information library 42 is configured to encrypt the sharing cryptographic library by biological characteristic information of the biological characteristic library. An encryption method includes the following encryption manners.

(1) The sharing cryptographic library is encrypted by a single password (e.g., an iris recognition information).

(2) The sharing cryptographic library is encrypted by multiple parallel passwords. For example, the iris recognition information and fingerprint information are used to execute a parallel encryption so that either one of the iris recognition information and fingerprint information can decrypt the parallel encryption.

(3) The sharing cryptographic library is encrypted by multiple combined passwords. For example, the iris recognition information and fingerprint information are used to execute a combined encryption so that both the iris recognition information and fingerprint information can decrypt the combined decryption.

The receiving unit 44 is configured to receive the first biological characteristic information of the user.

The receiving unit 44 is further configured to decrypt the sharing cryptographic library with the decryption by the first biological characteristic information. In at least one embodiment, the decrypted method corresponds to the three ways of the above-mentioned encryption operations Furthermore, the determination unit 45 is configured to determine whether a push request is simultaneously received from a second terminal device, where the push request includes a second biological characteristic information and a current application program identification code.

The determination unit 45 includes a timing sub-unit 451 and a receiving sub-unit 452.

The timing sub-unit 451 is configured to set a time interval threshold, such as 60 seconds or three minutes.

The receiving sub-unit 452 is configured to determine whether the push request is simultaneously received from the second terminal device within the time interval threshold.

The matching unit 46 is configured to determine whether the first biological characteristic information is matched with the second biological characteristic information.

In detail, the matching unit 46 includes a determination sub-unit 461 and a resulting sub-unit 462.

The determination sub-unit 461 is configured to determine whether the first biological characteristic information and the second biological characteristic information originate from the biological characteristic library. In at least one embodiment, the first biological characteristic information and the second biological characteristic information are the same type or different types of information. In at least one embodiment, when the biological characteristic information belongs to the same user, either iris recognition information acquired by the first terminal device can be matched with iris recognition information acquired by the second terminal device, or the iris recognition information of the user can be matched with the fingerprint information of the user.

The resulting sub-unit 462 is configured to indicate that when the first biological characteristic information and the second biological characteristic information originate from the biological characteristic library, the first biological characteristic information is matched with the second biological characteristic information, and when the first biological characteristic information and the second biological characteristic information does not originate from the biological characteristic library, the first biological characteristic information is not matched with the second biological characteristic information.

The pushing unit 47 is configured to read an account name and a password of an application program identification code from the sharing cryptographic library and to push the account name and the password of the application program identification code to the second terminal device, when the first biological characteristic information is matched with the second biological characteristic information.

In one at least on embodiment, the account names and the passwords are pushed to the second terminal device using either plain text or ciphertext.

The present disclosure provides a system of pushing passwords by storing biological characteristic information, application program identification codes, and account names and passwords which are matched with an application program into a terminal device for rapidly and safely sharing the passwords between the terminal devices.

Fourth Embodiment

Figure 5:
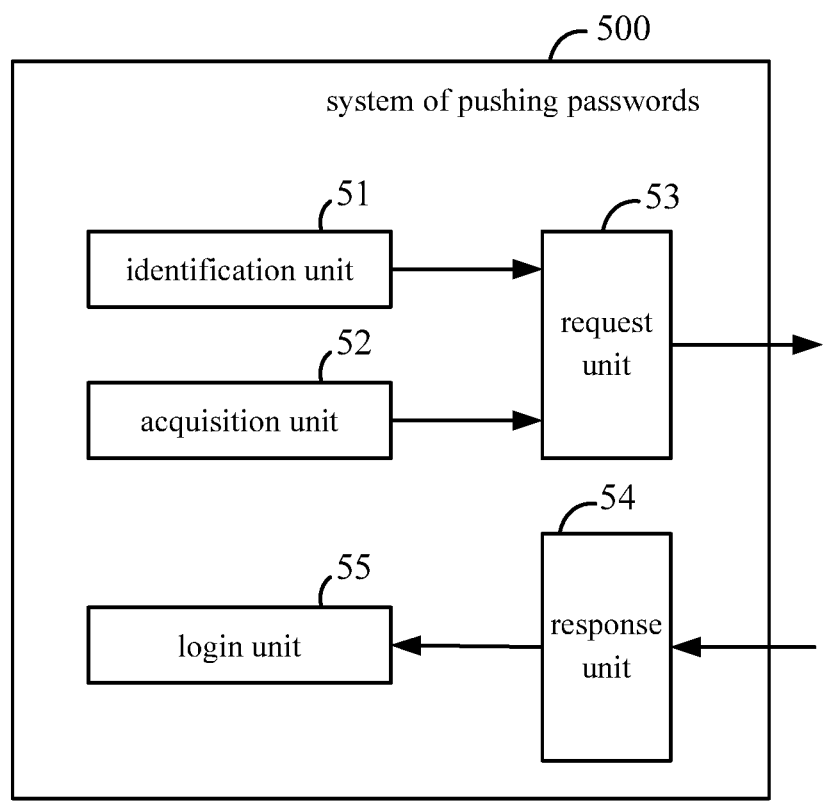
FIG. 5 is an illustrative block diagram of a system of pushing passwords according to a fourth embodiment of the present disclosure.

FIG. 5 is an illustrative block diagram of a system of pushing passwords according to a fourth embodiment of the present disclosure. In at least one embodiment, the system of pushing passwords performed in the second terminal transmits the passwords to the first terminal device and receives the pushing passwords from the first terminal device, where the terminal devices are selected from a smart phone, a computer, a smart watch, and smart glasses, and will not be enumerated herein.

The system 500 of pushing passwords includes an identification unit 51, an acquisition unit 52, a request unit 53, a response unit 54, and a login unit 55.

The identification unit 51 is configured to identify an application program identification code for extracting the application program identification code when a login interface of an application program is enabled. For example, in an application program "WeChat", the application program identification codes include wechat, QQ chat, or a preset identification code "001." In another example of "NETEASE" news in an application program, the expressions of the application program identification codes include netease, Net Ease, or a preset identification code "163".

The acquisition unit 52 is configured to acquire second biological characteristic information of the user.

In at least one embodiment, the acquisition unit 52 includes a video acquisition unit to acquire the iris recognition information and face recognition information, a fingerprint acquisition unit to acquire the fingerprint information and palmprint information, and/or an audio acquisition unit to acquire the acoustic information.

The request unit 53 coupled to the identification unit 51 and acquisition unit 52 is configured to transmit a push request to the first terminal device, where the push request includes the second biological characteristic information of the user and a current application program identification code.

In at least one embodiment, when the second terminal device transmits the push request to the first terminal device, the second terminal device further sends an identification code of the second terminal device to the first terminal device so that a response pushed by the first terminal device is fed hack to the second terminal device.

The response unit 54 is configured to receive a push response from the first terminal device, where the push response includes an account name and a password corresponding to the current application program identification code.

The login unit 55 is configured to input the account name and password of the push response to the login interface of the application program.

The present disclosure provides a system of pushing passwords by storing biological characteristic information, application program identification codes, and account names and passwords which are matched with an application program into a terminal device for rapidly and safely sharing the passwords between the terminal devices.

Fifth Embodiment

Figure 6:
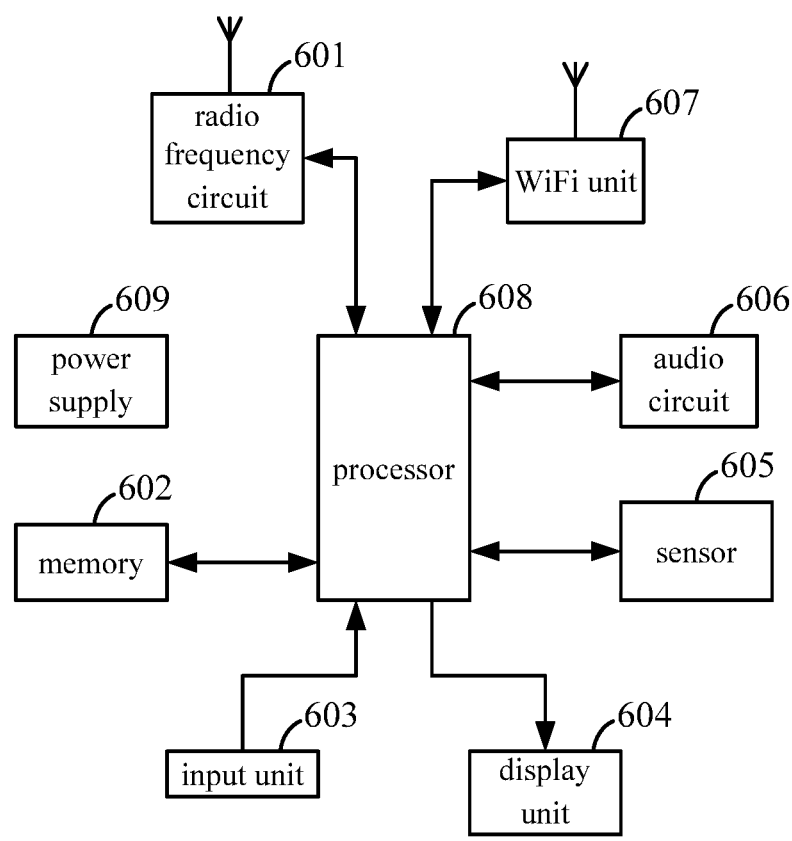
FIG. 6 is an illustrative hardware environment diagram of a terminal device according to one embodiment of the present disclosure.

As shown in FIG. 6, the present disclosure further provides a terminal device. The terminal device includes a radio frequency circuit 601, at least one computer readable storage medium memory 602, an input unit 603, a display unit 604, a sensor (e.g., a fingerprint sensor) 605, an audio circuit 606, a WIFI unit 607, at least one processor 608 having one or more processing cores, a power supply 609, and a camera (not shown). As will be appreciated by persons skilled in the art, a terminal device in FIG. 6 can include more or fewer components, or a combination of certain components, or a different arrangement of components.

The at least one computer readable storage medium memory 602 stores instructions performed by the processor 608. The processor 608 is configured to execute the instructions in the memory 602, where the instructions perform the method of pushing passwords in the first and second embodiments and the system of pushing passwords in the third and fourth embodiments (i.e., the first terminal device and the second terminal device).

The method of pushing passwords, a pushing system and a terminal device of the present disclosure belong the same concept, and the specific implementation process will be described in the specification and will not be repeated herein.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method of pushing passwords applicable to a first terminal device, comprising:
    receiving a first biological characteristic information of a user, wherein a sharing cryptographic library stores a plurality of application program identification codes, and one account name and one password correspond to each application program identification code;
    determining that a push request is simultaneously received from a second terminal device, wherein the push request comprises a second biological characteristic information and a current application program identification code;

determining whether the first biological characteristic information captured at the first terminal device matches with the second biological characteristic information from the second terminal device; and when the first biological characteristic information captured at the first terminal device is matched with the second biological characteristic information from the second terminal device, reading an account name and a password of the current application program identification code from the sharing cryptographic library, and pushing the account name and the password of the current application program identification code to the second terminal device;

establishing a biological characteristic library including a plurality of biological characteristic information of the user;

encrypting the sharing cryptographic library by the biological characteristic information of the biological characteristic library.

2. The method of pushing passwords according to claim 1, wherein determining whether the first biological characteristic information matches with the second biological characteristic information comprises:

establishing a biological characteristic library corresponding to the user;

determining whether the first biological characteristic information and the second biological characteristic information originate from a same biological characteristic library;

when the first biological characteristic information and the second biological characteristic information originate from the biological characteristic library, the first biological characteristic information matches with the second biological characteristic information; and when the first biological characteristic information and the second biological characteristic information do not originate from the biological characteristic library, the first biological characteristic information does not match with the second biological characteristic information.

3. The method of pushing passwords according to claim 2, wherein when determining whether the first biological characteristic information is matched with the second biological characteristic information, the first biological characteristic information and the second biological characteristic information are either a same type or different types of information.

4. The method of pushing passwords according to claim 1, wherein determining whether the push request is simultaneously received from the second terminal device comprising:

setting a time interval threshold; and determining that the push request is simultaneously received from the second terminal device within the time interval threshold.

5. The method of pushing passwords according to claim 1, further comprising:

establishing the sharing cryptographic library that stores the plurality of application program identification codes, wherein one account name and one password correspond to each application program identification code.

6. The method of pushing passwords according to claim 2, wherein a plurality of types of biological characteristic information in the biological characteristic library are selected from one group consisting of iris recognition information, face recognition information, fingerprint information, palmprint information, and acoustic information.

7. A system of pushing passwords applicable to a first terminal device, comprising:

at least one computer readable storage medium memory for storing instructions; and a processor connected to the at least one computer readable storage medium for executing the instructions performing following operations:

a sharing cryptographic library configured to cause the processor to store a plurality of application program identification codes, wherein one account name and one password correspond to each application program identification code;

a receiving unit configured to cause the processor to receive a first biological characteristic information of a user;

a determination unit configured to cause the processor to determine that a push request is simultaneously received from a second terminal device, wherein the push request comprises a second biological characteristic information and a current application program identification code;

a matching unit configured to cause the processor to determine whether the first biological characteristic information captured at the first terminal device matches with the second biological characteristic information from the second terminal device; and a pushing unit configured to cause the processor to read an account name and a password of the current application program identification code from the sharing cryptographic library, and to push the account name and the password of the current application program identification code to the second terminal device, when the first biological characteristic information captured at the first terminal device matches with the second biological characteristic information from the second terminal device;

a biological characteristic library corresponding to the user and configured to cause the processor to store biological characteristic information of the user, including a plurality of types of biological characteristic information;

an encryption unit configured to cause the processor to encrypt the sharing cryptographic library by the biological characteristic information of the biological characteristic library.

8. The system of pushing passwords according to claim 7, further comprising:

a biological characteristic library corresponding to the user and configured to cause the processor to store biological characteristic information of the user; and wherein the matching unit comprising comprises:

a determination sub-unit configured to cause the processor to determine whether the first biological characteristic information and the second biological characteristic information originate from the biological characteristic library; and a resulting sub-unit configured to cause the processor to indicate that when the first biological characteristic information and the second biological characteristic information originate from the biological characteristic library, the first biological characteristic information matches with the second biological characteristic information, and when the first biological characteristic information and the second biological characteristic information do not originate from the biological characteristic library, the first biological characteristic information does not match with the second biological characteristic information.

9. The system of pushing passwords according to claim 8, wherein the first biological characteristic information and the second biological characteristic information are either a same type or different types of information.

10. The system of pushing passwords according to claim 7, wherein determining that the push request is simultaneously received from the second terminal device comprising:
   a timing sub-unit configured to cause the processor to set a time interval threshold; and
   a receiving sub-unit configured to cause the processor to determine that the push request is simultaneously received from the second terminal device within the time interval threshold.

11. The system of pushing passwords according to claim 8, wherein a plurality of types of biological characteristic information in the biological characteristic library are selected from one group consisting of iris recognition information, face recognition information, fingerprint information, palmprint information, and acoustic information.

12. A terminal device comprising:
   at least one computer readable storage medium memory for storing instructions; and
   a processor connected to the at least one computer readable storage medium for executing the instructions performing following operations:
   a sharing cryptographic library configured to cause the processor to store a plurality of application program identification codes, wherein one account name and one password correspond to each application program identification code;
      a receiving unit configured to cause the processor to receive a first biological characteristic information of a user;
      a determination unit configured to cause the processor to determine that a push request is simultaneously received from a second terminal device, wherein the push request comprises a second biological characteristic information and a current application program identification code;
      a matching unit configured to cause the processor to determine whether the first biological characteristic information captured at the first terminal device matches with the second biological characteristic information from the second terminal device; and
   a pushing unit configured to cause the processor to read an account name and a password of the current application program identification code from the sharing cryptographic library, and to push the account name and the password of the current application program identification code to the second terminal device, when the first biological characteristic information captured at the first terminal device matches with the second biological characteristic information from the second terminal device;
      a biological characteristic library corresponding to the user and configured cause the processor to store biological characteristic information of the user, including a plurality of types of biological characteristic information;
      an encryption unit configured to cause the processor to encrypt the sharing cryptographic library by the biological characteristic information of the biological characteristic library.

13. The terminal device according to claim 12, further comprising a camera, a fingerprint sensor, and an audio circuit coupled to the receiving unit.

14. The terminal device according to claim 12, further comprising:
   a biological characteristic library corresponding to the user and configured cause the processor to store biological characteristic information of the user, wherein a plurality of types of biological characteristic information in the biological characteristic library are selected from one group consisting of iris recognition information, face recognition information, fingerprint information, palmprint information, and acoustic information; and
the matching unit comprising:
   a determination sub-unit configured to cause the processor to determine whether the first biological characteristic information and the second biological characteristic information originate from the biological characteristic library; and
   a resulting sub-unit configured to cause the processor to indicate that when the first biological characteristic information and the second biological characteristic information originate from the biological characteristic library, the first biological characteristic information matches with the second biological characteristic information, and when the first biological characteristic information and the second biological characteristic information does not originate from the biological characteristic library, the first biological characteristic information do not match with the second biological characteristic information.

15. The terminal device according to claim 14, wherein the first biological characteristic information and the second biological characteristic information are either a same type or different types of information.

16. The terminal device according to claim 12, wherein determining that the push request is simultaneously received from the second terminal device comprising:
   a timing sub-unit configured to cause the processor to set a time interval threshold; and
   a receiving sub-unit configured to cause the processor to determine that the push request is simultaneously received from the second terminal device within the time interval threshold.

17. The terminal device according to claim 12, wherein the terminal device is selected from one group consisting of a notebook computer, a desktop computer, a smart phone, a smart watch, and smart glasses.

* * * * *